United States Patent [19]

Strauss et al.

[11] 4,256,431

[45] Mar. 17, 1981

[54] SELF-DRIVEN FORAGE HARVESTER

[75] Inventors: Werner Strauss, Kehl; Xaver Lenzer, Kleinkötz, both of Fed. Rep. of Germany

[73] Assignee: Karl Mengele & Sohne Maschinenfabrik und Eisengiesserei GmbH & Co., Gunzburg, Fed. Rep. of Germany

[21] Appl. No.: 26,214

[22] Filed: Apr. 2, 1979

[30] Foreign Application Priority Data

Mar. 22, 1978 [DE] Fed. Rep. of Germany ....... 2812430

[51] Int. Cl.$^3$ ............................................. B60P 1/38
[52] U.S. Cl. ...................................... 414/505; 56/16.6; 414/528
[58] Field of Search .................... 56/16.6, 13.3, 11.9; 180/14 A, 54 F; 414/334, 335, 340, 345, 502–505, 528

[56] References Cited

U.S. PATENT DOCUMENTS

| 3,317,064 | 5/1967 | Fingerut | 414/334 X |
| 3,705,638 | 12/1972 | Shock | 180/14 A |

FOREIGN PATENT DOCUMENTS

| 1530735 | 6/1969 | Fed. Rep. of Germany | 414/502 |
| 836946 | 6/1960 | United Kingdom . | |
| 1021672 | 3/1966 | United Kingdom . | |
| 1180585 | 2/1970 | United Kingdom . | |
| 1231180 | 5/1971 | United Kingdom | 180/14 A |

*Primary Examiner*—Andres Kashnikow
*Attorney, Agent, or Firm*—Toren, McGeady and Stanger

[57] ABSTRACT

A self-driven forage harvester including a main vehicle and a trailer operatively joined therewith wherein the trailer includes an upwardly inclined scraper floor and an axle with a pair of drive wheels located below the forward half of the scraper floor. The main vehicle also includes a drive axle and drive wheels with a drive unit for the forage harvester being mounted thereabove. A pair of steering wheels are located forwardly of the main vehicle drive wheels.

4 Claims, 1 Drawing Figure

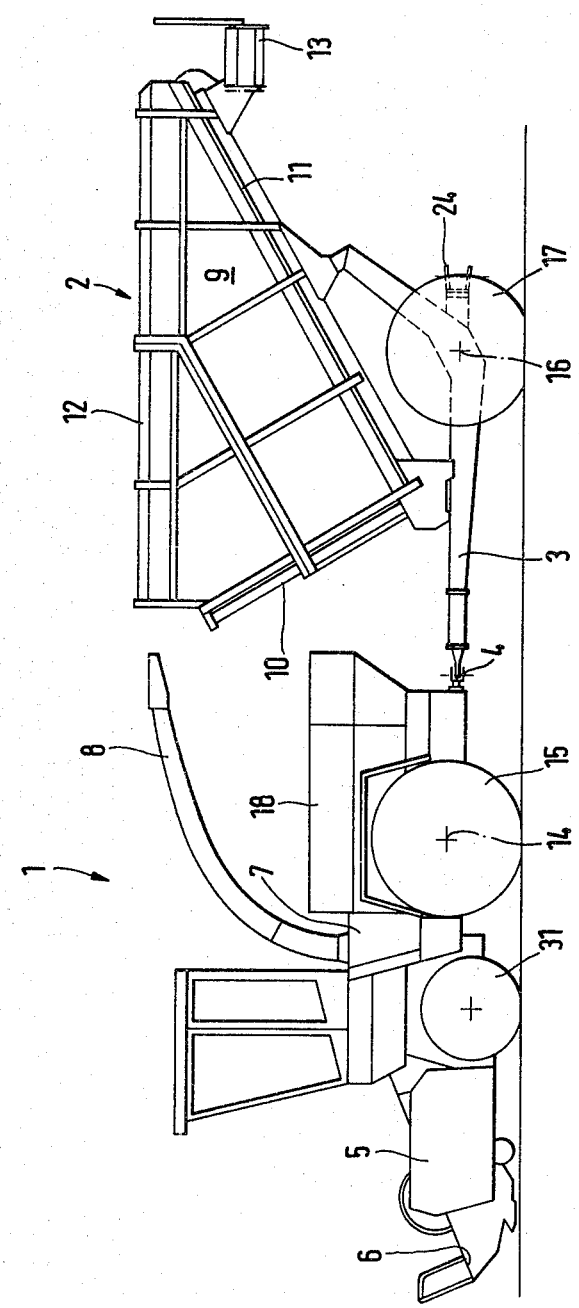

SELF-DRIVEN FORAGE HARVESTER

BACKGROUND OF THE INVENTION

The present invention relates generally to agricultural vehicles and particularly to a self-driven forage harvester having a main vehicle and a trailer operatively connected thereto, the trailer being the type which includes auxiliary means for discharge of material in the form of an inclined scraper floor which is rearwardly inclined ascending to an upper discharge end at the rear of the trailer.

The tractive or motive power of self-driven forage harvesters is to a great extent limited due to the power which must be provided for driving the implements or auxiliary equipment operatively associated with the harvester. As a result, self-driven forage harvesters cannot normally be utilized as towing vehicles or tractors if the dimensions and size characteristics of the device are to be maintained within economical limitations. Accordingly, considering the various terrains over which such agricultural devices must travel, the use of known, conventional forage harvesters is rather limited.

Known self-driven forage harvesters of this type normally include a hopper which is arranged on the chassis of the vehicle at a location above the driving axle. Such harvesters also include an inclined scraper floor which ascends rearwardly to an upper container at the end of the vehicle. The scraper floor includes an overhanging discharge end by means of which a subadjacent vehicle may be loaded from the forage harvester.

However, the scraper floor which is usually driven by the same hydraulic engine which drives the vehicle, cannot for the most part be operated if the forage harvester is moving because under such circumstances the major portion of the available driving power is required to propel the forage harvester.

Moreover, if operational problems develop in the discharge device, the entire forage harvester unit will usually break down.

Further disadvantages relate to the fact that the overall mechanism, including the hopper which is arranged thereon, has a relatively high center of gravity. Thus, the forage harvester will be rather difficult to maneuver in rough terrain. Wheel grip will vary with differing loads and tractive power will be lost due to slippage thereby causing further disadvantageous operating features.

It is therefore a primary objective of the present invention to provide a self-driven forage harvester which will exhibit improved driving characteristics and wherein changing load conditions will have a significantly lesser effect upon the driving characteristics of the vehicle.

SUMMARY OF THE INVENTION

Briefly, the present invention may be described as comprising a self-driven forage harvester including a main vehicle and a trailer operatively joined thereto. The main vehicle includes a first pair of drive wheels mounted on a drive axle of the main vehicle with a pair of steering wheels being located forwardly of the drive wheels, and with a hydrostatic driving unit being located on the main vehicle above the drive axle thereof. The trailer vehicle also includes a drive axle with a pair of drive wheels and the trailer is provided with an upwardly inclined scraper floor which extends continuously from a lower forward end to an upper discharge end thereof. In accordance with the invention, the hydraulic drive axle of the trailer is located to extend beneath the scraper floor along a portion thereof intermediate the lower forward end and the midpoint of the scraper floor.

The trailer includes a front end wall which extends upwardly and forwardly from the lower forward end of the scraper floor and which overhangs the main vehicle. A tiltable transverse conveyor is provided on the trailer adjacent the upper discharge end of the scraper floor.

The objectives of the invention are achieved in that the forage harvester is constructed as an assembly which includes a two-wheeled bulk trailer having a second hydraulic drive axle with this drive axle being preferably arranged approximately beneath the front half of the scraper floor. The tractor is always uniformly loaded with respect to the distribution of weight because, in the construction in accordance with the invention, there is no additional loading on the forage harvester main vehicle and the supporting load is essentially absorbed within the overall four-wheeled unit. Only the drive wheels of the trailer must absorb varying groung pressures which, however, becomes essentially insignificant when considering the favorable overall driving characteristics which arise as a result of distribution of the load over the entire four-wheeled unit.

A favorable weight distribution is also achieved in that the front end wall of the bulk trailer overhangs the main vehicle of the forage harvester.

With this combined vehicle assembly, a four-wheel actuation always with sufficient wheel grip and favorable load distribution is provided which imparts to the vehicle especially good cross-country mobility. Moreover, the driving power for the drive unit is dimensioned in an especially favorable relationship relative to the driving power required for the vehicle implements or auxiliary equipment so that the bulk trailer may always have, in addition to the scraper floor, a hydrostatically driven tiltable transverse conveyor operatively arranged relative to the discharge end of the scraper floor. This results in greater versatility in the discharge application for the bulk trailer and, therefore, a wider variety of harvest recovery procedures may be accomplished by the forage harvester during its travel.

Should there occur a breakdown in the implements or auxiliary equipment of the forage harvester or a breakdown in the drive unit of the bulk trailer, the forage harvester may operate without difficulty together with other transportation vehicles as a makeshift solution for the breakdown and there is thus avoided a complete breakdown of the entire machine.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWING

In the drawing:

The drawing of the present application is a schematic side elevation of a forage harvester vehicle assembly constructed in accordance with the present invention.

DETAILED DESCRIPTION OF THE PREFERRED EMBODIMENT

As shown in the drawing, the forage harvester of the invention includes a self-driven main vehicle 1 which serves as a tractor or pulling mechanism for the forage harvester with a bulk trailer 2 being coupled to the main vehicle 1 by a yoke 4 of the main vehicle and by means of a draw bar 3. At the forward end of the main vehicle 1 there is arranged a cutting device 6 which is connected with a receiving apparatus 5.

A blower mechanism 7 is connected with the cutting device and a crop chute or discharge conduit 8 receives cut crop material from the blower 7 in order to deliver the crop material to the hopper or bulk trailer 2.

The bulk trailer 2 is composed of side walls 9 and a front end wall 10. The trailer 2 also includes an inclined scraper floor 11 which ascends upwardly from a lower forward end thereof to an upper rear discharge end thereof. The trailer 2 includes a cover member 12 which may generally consist of a closely meshed net. A tiltable transverse conveyor belt 13 is arranged in operative relationship with the rear discharge end of the inclined scraper floor 11 so that crop material conveyed from the scraper floor may be deposited upon the transverse conveyor 13 so that lateral discharge of crop material may be accomplished from the forage harvester. For example, if transportation vehicles are arranged to be driven in parallel relationship to the forage harvester of the invention, loading of such parallel-driven vehicles by transverse conveying of crop material may be readily accomplished. Of course, other unloading or loading operations may also be achieved and transportation vehicles positioned at the field edge may also be loaded or it may be possible to couple a transportation vehicle to a yoke 24 and to transfer the load of the forage harvester continuously during operation.

In accordance with the present invention, the self-driven main vehicle 1 of the forage harvester of the invention includes a drive axle 14 having hydraulic drive wheels 15 operatively associated therewith. The bulk trailer 2 coupled to the main vehicle 1 also includes a drive axle 16 and drive wheels 17 which are approximately of the same size and which are hydraulically driven.

A drive motor 18 of the forage harvester is mounted above the drive axle 14 of the main vehicle 1 and as a result, the drive axle 14 is always uniformly loaded. The main vehicle 1 also includes steering wheels 31 which are located forwardly of the drive wheels 15.

The drive axle 16 of the trailer vehicle 2 is arranged to be located to extend below a portion of the scraper floor 11 which comprises the forward-most half thereof with the axle 16 being located beneath a section of the inclined scraper floor 11 intermediate the lower forward end and the midpoint thereof.

Furthermore, the front end wall 10 is inclined to extend upwardly and forwardly from the lower forward end of the scraper floor 11 and the end wall 10 is arranged to overhang the main vehicle 1. As a result, not only is better weight distribution achieved but discharge of crop material into the trailer 2 from the crop chute 8 is facilitated.

With the arrangement of the present invention, varying or additional loading of the bulk trailer 1 may be accomplished without significantly adversely affecting the overall operation or mobility of the forage harvester when taking into consideration the four-wheel drive of the device.

While a specific embodiment of the invention has been shown and described in detail to illustrate the application of the inventive principles, it will be understood that the invention may be embodied otherwise without departing from such principles.

What is claimed is:

1. A self-driven forage harvester comprising: a main vehicle; a trailer operatively joined to said main vehicle; a first hydraulic drive axle including a first pair of drive wheels on said main vehicle; steering wheels for said main vehicle located forwardly of said first pair of drive wheels; a hydrostatic driving unit on said main vehicle arranged in the general vicinity of said drive axle; a second hydraulic drive axle on said trailer including a second pair of drive wheels for said trailer; and an upwardly inclined scraper floor formed in said trailer extending continuously from a lower forward end to an upper discharge end thereof; said second hydraulic drive axle of said trailer being located to extend beneath said scraper floor along a portion thereof intermediate said lower forward end and the midpoint of said scraper floor.

2. A forage harvester according to claim 1 wherein said trailer includes an inclined front end wall extending upwardly and forwardly from said lower forward end of said scraper floor, said front end wall extending to overhang said main vehicle.

3. A forage harvester according to claim 1 further including a tiltable transverse conveyer provided on said trailer in operative relationship with said upper discharge end of said scraper floor.

4. A forage harvester according to claim 1 wherein said hydrostatic driving unit is located and supported directly above said first drive axle.

* * * * *